Feb. 20, 1968 E. M. FREDERIKSEN ET AL 3,369,779
FORCE BOOSTING MECHANISM
Filed July 18, 1966 2 Sheets-Sheet 1
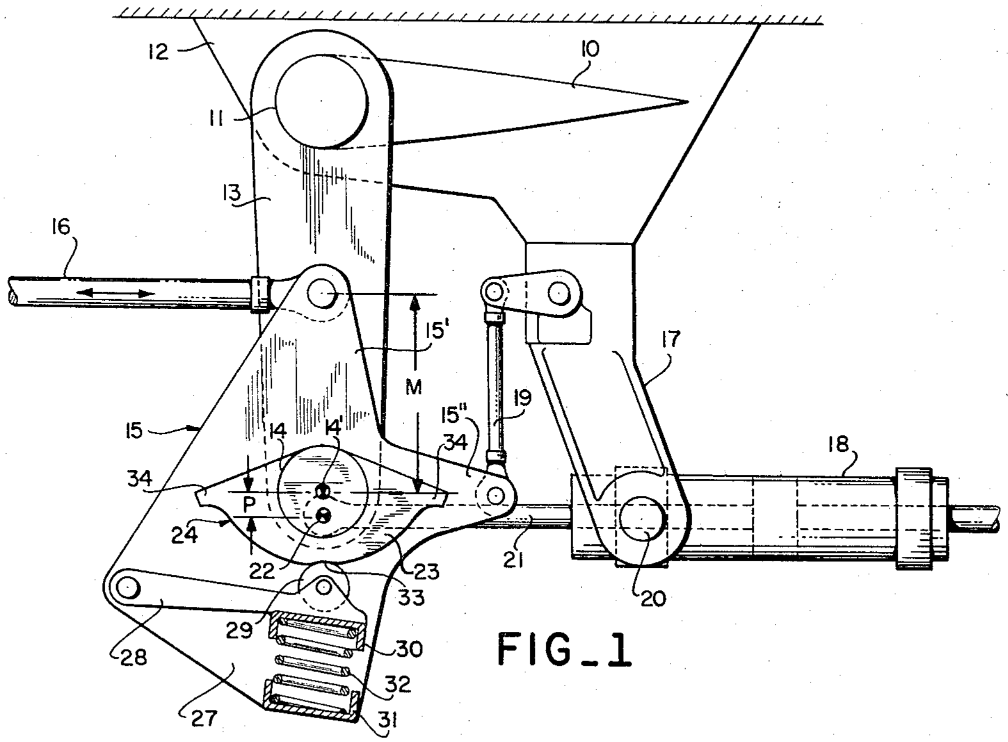
FIG_1
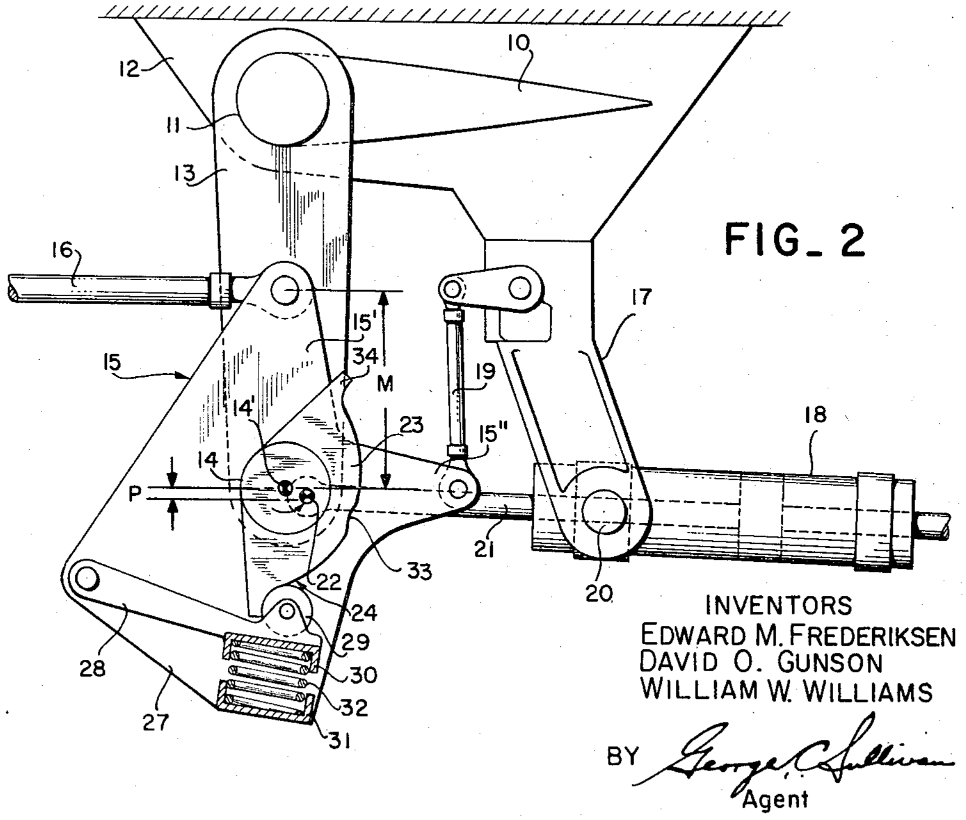
FIG_2
INVENTORS
EDWARD M. FREDERIKSEN
DAVID O. GUNSON
WILLIAM W. WILLIAMS
BY George C. Sullivan
Agent

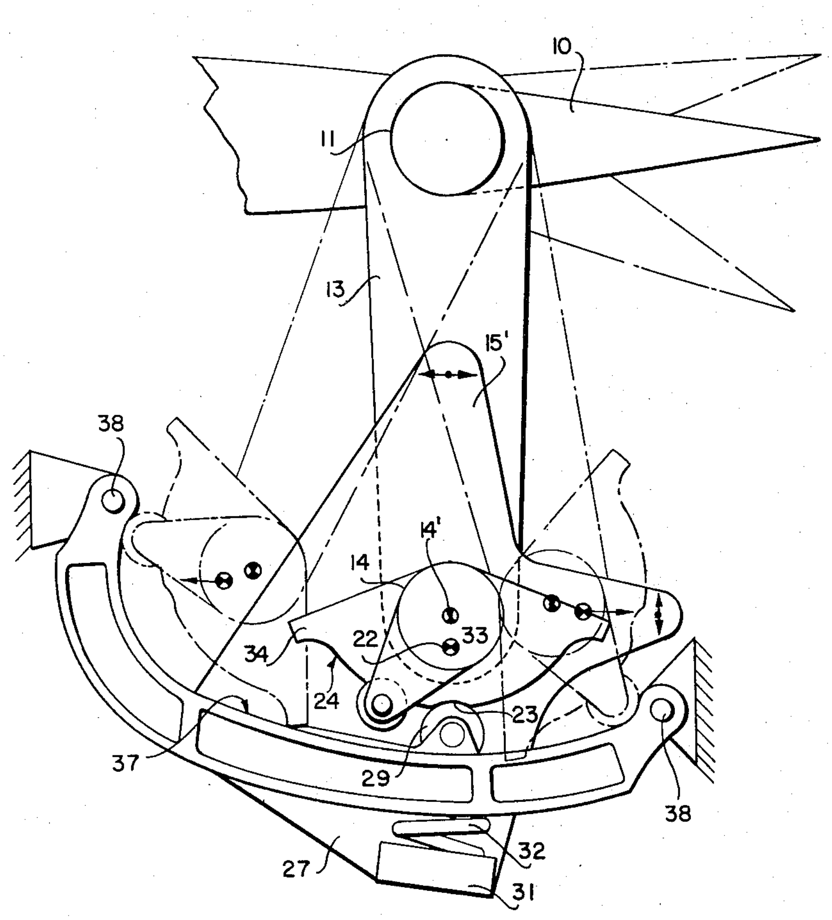
FIG_ 3
INVENTORS
EDWARD M. FREDERIKSEN
DAVID O. GUNSON
WILLIAM W. WILLIAMS
BY George C. Sullivan
Agent United States Patent Office 3,369,779
Patented Feb. 20, 1968

3,369,779

FORCE BOOSTING MECHANISM

Edward M. Frederiksen, David O. Gunson, and William W. Williams, Atlanta, Ga., assignors to Lockheed Aircraft Corporation, Burbank, Calif.

Filed July 18, 1966, Ser. No. 566,045
7 Claims. (Cl. 244—85)

This invention relates to improvements in force boosting mechanisms and more particularly to such a mechanism having a boost ratio that is proportional to the input force up to a pre-established maximum short of full power. As an added feature, means is provided which relates on a continuous basis the boost ratio to the actual position of the load.

Among other things, the present invention proposes a force booster which senses input force and varies its output force accordingly, employing uncomplicated, mechanical means. In this way the boost ratio is automatically adjusted in an instantaneous manner to meet the particular physical requirements of the operator while at all times remaining a boost as opposed to a full power system. This results in a more intimate awareness by the operator of the force being applied to the load or driven member, avoiding the problems of over-control, feel back mechanisms, etc., of full power systems.

While it is not limited to, the instant invention finds particular utility in aircraft for the operation of the external control surfaces. The aerodynamic loads acting on such surfaces tend to maintain or freeze them in the neutral position, and the force required to deflect them to either side of neutral for directional movement of the aircraft increases with the speed of the aircraft.

To facilitate this required movement of the control surfaces and assure pilot control of the aircraft, special provisions have been made in the linkage between the pilot's control lever within the cabin or cockpit and the several external, movable surfaces. Initially, this linkage included means to give the pilot a mechanical advantage, but as the forces required become greater, full power actuators in the form of hydraulic cylinders and the like have been employed. With full power actuators, the pilot is in fact merely moving a control valve for the actuator which performs the work. In order to prevent over-control and to apprise the pilot at all times of the position of the movable surfaces, various feel back mechanisms have been used. Thus, these full power actuators remove the pilot from direct control of the aircraft and interpose an artificial reverse force in the system that attempts to simulate, on an appreciably reduced scale, the forces actually involved.

The advantages gained through the use of the full power system are at the price of the intimate awareness by the pilot of the aircraft maneuvers characteristic of the more direct boost system. Also, the inherent lag time in such power systems which, although slight, can be and has been fatal in high speed aircraft. In addition, the added complexity of such power systems introduces questions concerning reliability and the added provisions of overriding emergency systems or fail safe and similar support equipment.

The present invention is therefore directed to improvements in the boost system whereby it can be made competitive with the power system. Ideally, it is sought to obtain the benefits of both systems. To this end, a power actuator is employed to augment or supplement the force applied directly to the movable control surface by the pilot and separate adjustment means to vary the ratio between the pilot's force and the actuator's force, that is concurrently and automatically operated by the pilot in applying his proportion of that force. The preset limits of this adjustment means is such as to prevent the possibility of a full power condition, i.e., a condition where the actuator's force alone is applied to the control surface. The organization and arrangement of this actuator and adjustment means is such that a follow-up reverse force is imposed in the system to tend to always return the movable control surface to neutral, giving the pilot a direct rather than an indirect or simulated feel.

Additionally, the boost limiting device is provided to establish and maintain the range of the boost ratio to be attained. This device connects the control surface to the ratio adjustment means in such a way that the position of the latter is automatically coordinated with that of the former to prevent the application of a boost force in excess of the structural capabilities of the aircraft.

With the above and other objects in view as will be apparent, this invention consists in the construction, combination and arrangement of parts all as hereinafter more fully described, claimed and illustrated in the accompanying drawings wherein:

FIGURE 1 is a general schematic view of a variable booster constructed in accordance with the teachings hereof as applied to an aircraft control surface and showing the booster in the minimum ratio position, i.e., a position where the pilot's mechanical advantage is the least;

FIGURE 2 is a similar view showing the booster in the maximum ratio position, i.e., where the pilot's mechanical advantage is the greatest; and FIGURE 3 is a similar view of the boost limiting device and the associated parts of the booster to show the interconnection thereof whereby the operational range of the booster is limited as a function of the control surface position.

Referring more particularly to the drawings, 10 designates an external movable control surface typical of that employed on fixed wing aircraft to control the flight direction thereof. At its inner end, this control surface 10 is carried by and projects from a torque tube 11. The torque tube 11 in turn is pivotally mounted in adjacent fixed structure 12 of the aircraft.

Secured to and projecting at an angle from the torque tube 11, is a lever or horn 13, the outer or free end of which is journalled on a shaft 14. Also journalled or otherwise rotatably mounted on the shaft 14 is a bellcrank lever 15, one arm 15' of which is pivotally connected to a pilot's push-pull rod 16 connected through appropriate and conventional linkage at its other end to the control lever or stick within the cabin of the aircraft. The other arm 15'' of the bellcrank 15 is pivotally connected to the stem of a control valve 17 of a power unit, such as, for example, a hydraulic cylinder 18 through a connecting link 19.

The cylinder 18 is pivotally secured to convenient associated structure through a trunnion 20 or the equivalent. A piston rod 21 extending from the cylinder 18 terminates in a pivotal connection, as at 22, with a plate 23 secured to and carried by the shaft 14. The plate 23 is defined at and along one edge by a cam surface 24 that is preferably symmetrical about the axis of rotation 14' of the shaft 14 and pivot 22 is radially displaced from the axis 14' to thereby form a lever arm P between the cylinder 18 and the axis 14'. The distance from the axis 14' to the axis of torque tube 11 constitutes the power arm for the operation of the control surface 10. A separate mechanical advantage or leverage arm M is provided between the pilot's push-pull rod 16 and the axis 14'.

In view of the foregoing construction and arrangement, the relative lengths of the arms M and P are varied concurrently with the application of an input force through the pilot's push-pull rod 16 effecting the operation of the cylinder 18 to move the pivotal connection 22 rotatably about the axis 14' of the shaft 14. The length of the power arm P is thereby adjusted with respect to the mechanical leverage arm M. The boost ratio, i.e., the percentage of the pilot's force with respect to the power cylinder force operative in the rotation of the horn 13 for deflection of the control surface 10 is therefore varied accordingly.

The bellcrank 15 is formed or otherwise provided with an extension 27 located in opposition to its arms 15' and 15'' to pivotally mount a spring lever 28 to the outer end of which a roller 29 is fastened. A cup member 30 is carried by the spring lever 28 in opposition to the roller 29 for coaction with a similar cup member 31 secured to and carried by the extension 27. A compression spring 32 is mounted within the cup members 30 and 31 and acts in a direction to force them apart whereby the roller 29 is forced against the cam surface 24 at all times. The plate 23 is thereby spring-biased to the neutral position so that the shaft 14 is maintained in a neutral position and when deflected therefrom by the force of the cylinder 18 will return to the neutral position upon a release of the deflecting force of the cylinder 18. This biased neutral position of the plate 23 is further ensured by a notch 33 provided in the cam surface 24. A stop 34 carried by the plate 23 is disposed on each side of the axis 14' to limit the rotation of the plate 23 when thus deflected.

It is noted that the force required to rotate the plate 23 and compress spring 32 through the cam surface 24 and the roller 29 is supplied by an increased axial movement of the hydraulic boost cylinder 18 rotating freely about its pivot 20. Thus, when the pilot exerts a force on the push-pull rod 16, the length of the power arm P is automatically and concurrently adjusted with the mechanical input by the pilot. The rotational force on the horn 13 is the sum of the forces exerted by the cylinder 18 and the pilot's force exerted on push-pull rod 16 acting the axis 14'.

Moments about axis 14' are zero (0), i.e., the pilot's force in push-pull rod 16 times M equals the force exerted by cylinder 18 times P; therefor, the two (2) forces add and act at axis 14' to apply torque to the torque tube 11 through horn 13, regardless of the angular position of horn 13 within the limits of its travel. Bellcrank lever 15 does not rotate except for the small amount necessary to operate the valve 17.

Also mounted on and projecting radially from the shaft 14 is an arm 35 carrying a roller 36 at its outer end. The roller 36 is disposed in the plane of a fixed cam surface 37 secured as at 38 to aircraft structure. Thus, when the plate 23 rotate, its rotary motion is limited by the roller 36 contacting the fixed cam surface 37 establishing the minimum length of power arm P. The configuration of the fixed cam surface 37 therefore automatically limits the force output of the booster as a function of control surface position and is designed or tailored to the particular aircraft and its performance characteristics.

It is to be understood that the foregoing disclosure is directed to a preferred embodiment of the invention illustrated and described schematically and in the singular (with respect to parts such as cam surface 24 and 37, etc., which as a practical matter are employed in coacting pairs) for the purposes of clarity and an understanding of the invention. Numerous changes and modifications of this embodiment may be made without departing from the spirit and scope of the invention as set forth in the appended claims.

What is claimed is:

1. A force boosting mechanism for aircraft having an external control surface hinged to fixed structure of the aircraft and exposed to aerodynamic forces comprising:
- a horn connected to and extending from said control surface;
- a transverse shaft pivotally mounted in the outer end of said horn;
- a bellcrank rotatably mounted on said shaft;
- a pilot's push-pull rod;
- a pivotal connection between one arm of said bellcrank and said push-pull rod;
- a plate fixedly mounted on said shaft;
- a power actuator pivotally connected at its outer end to said plate in spaced relation to the axis of rotation of said shaft;
- a control for the extension and contraction of said actuator whereby said plate is rotated about said shaft axis of rotation;
- a pivotal connection between the other arm of said bellcrank and said control; and
- biasing means operative on said plate tending to maintain it with its pivotal connection to said actuator, the pivotal connection of said one bellcrank arm and said shaft axis of rotation in a line.

2. The mechanism of claim 1 including a stop carried by said plate adjacent each end thereof and disposed in the path of rotation of coacting means carried by said bellcrank to limit the relative rotation therebetween.

3. The mechanism of claim 1 wherein said biasing means includes a cam surface on said plate, and a roller on said bellcrank.

4. The mechanism of claim 3 wherein said cam surface is symmetrical about said shaft, and said roller is spring-biased.

5. The mechanism of claim 3 including a notch in said cam surface adapted to receive said roller when said pivotal connections and said shaft axis of rotation are in a line as aforesaid.

6. The mechanism of claim 1 including a lateral projection carried by said shaft, and a fixed engagement carried by associated aircraft structure to arrest said projection in each direction of rotation of said shaft and thereby limit rotation of said plate about the shaft axis of rotation as aforesaid.

7. The mechanism of claim 6 wherein said projection includes a roller, and said engagement includes a cam surface for coaction with said roller.

References Cited

UNITED STATES PATENTS

| | | | |
|---|---|---|---|
| 2,591,871 | 4/1952 | Richolt | 244—85 XR |
| 2,627,847 | 2/1953 | Clark et al. | 91—369 |
| 2,750,928 | 6/1956 | Conway et al. | 91—391 XR |
| 2,849,198 | 8/1958 | Borngesser | 244—83 |

ANDREW H. FARRELL, *Primary Examiner.*